United States Patent Office 3,078,148
Patented Feb. 19, 1963

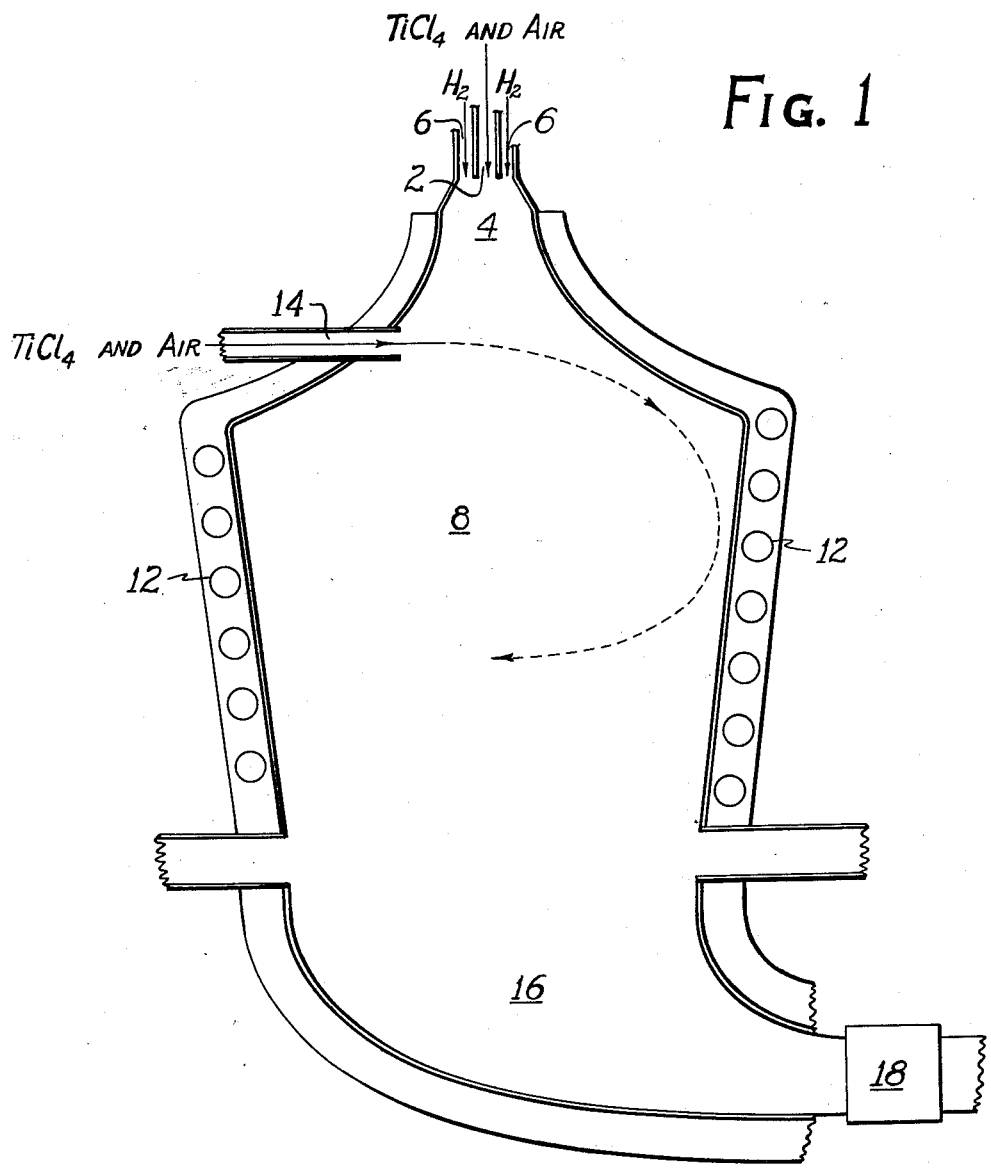

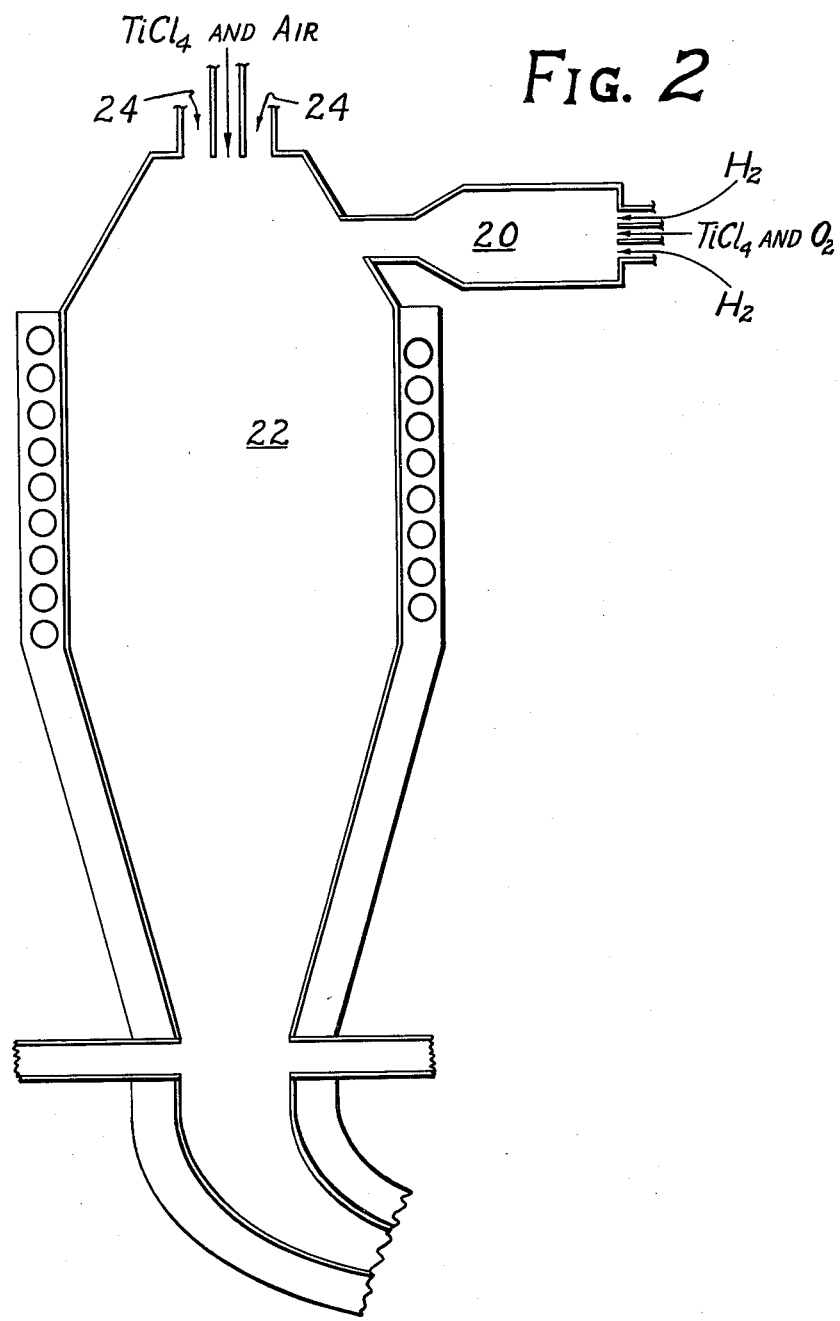

3,078,148
PROCESS FOR MAKING TITANIUM DIOXIDE
Louis S. Bellmap, Hingham, Gregor Berstein, Newton Center, and Randolph Antonsen, Boston, Mass., assignors to Cabot Corporation, Boston, Mass., a corporation of Delaware
Filed May 26, 1961, Ser. No. 112,922
3 Claims. (Cl. 23—202)

This invention generally relates to an improved process for producing pyrogenic titanium dioxide pigments and in particular to a process for producing spherical opacity-grade titanium dioxide pigments by vapor-phase reaction of titanium halides.

Currently, pyrogenic titanium dioxide is generally produced by converting at high temperatures a relatively volatile titanium compound, such as a halide, as illustrated by one of the following equations:

(a) $TiCl_4 + 2H_2 + O_2 \rightarrow TiO_2(s) + 4HCl$ (b) $TiCl_4 + O_2 \rightarrow TiO_2(s) + 2Cl_2$ Processes based on either of these reactions have severe disadvantages: The conversion represented by Equation a tends to produce titanium dioxide having a particle diameter too fine for pigment use, that is, titanium dioxide having an average particle diameter of less than about 0.2 micron, whereas titanium dioxide that is to be acceptable to the pigment industry must have a particle diameter between about 0.2 and 0.4 micron. While it is theoretically possible to produce titanium dioxide having a larger average particle diameter utilizing this method of conversion, the task has proven to be most difficult in practice. Also, processes embodying this reaction are relatively expensive since the chlorine (or other halogen) involved in the reaction is converted to a degraded and less valuable form, for example HCl.

The reaction of Equation b on the other hand, is readily adaptable to the production of titanium dioxide the partcles of which are as large as 0.2 to 0.4 micron. However, this reaction is much more erratic and less stable than the reaction of Equation a and, accordingly, it has not been possible thus far to produce by means of this reaction titanium dioxide particles that are uniformly spherical in shape as well as of proper size. Sphericity is highly desirable, as spherical particles are enormously easier to disperse, for example in a paint vehicle, than non-spherical particles and are also less abrasive.

In accordance with the process of the present invention, the reactions illustrated by Equations a and b are combined in such a way as to form a single process which embodies the advantages of both reactions but largely lacks the disadvantages of either. Accordingly, the pyrogenic titanium dioxide product of the present invention, is uniformly spherical in shape with an average particle diameter between about 0.2 and 0.4 micron.

It is a principal object of the present invention to provide an improved process for producing pyrogenic titanium dioxide pigments.

It is another object of the present invention to provide a process for producing pyrogenic titanium dioxide pigments having a uniform spherical shape with an average particle diameter of between about 0.2 and 0.4 micron.

It is another object of the present invention to produce such spherical, pyrogenic titanium dioxide pigments by a process primarily utilizing the more economically advantageous vapor-phase reaction, i.e. Equation b:

$TiCl_4 + O_2 \rightarrow TiO_2 + 2Cl_2$ without the use of nucleating agents other than nascent $TiO_2$ itself.

Other objects will in part be obvious and will in part appear hereinafter.

In accordance with the process of the present invention the volatile titanium compound which is to be converted to $TiO_2$, for example a halide such as titanium tetrachloride or a mixture of one or more halides, is divided into two separate streams one of which is only a fraction of the size of the other. The smaller stream is fed into a turbulent flame formed by burning a hydrogen-containing gas in an oxygen-containing gas. The hydrogen in the flame is sufficient to react with at least 50% of the titanium compound in said smaller stream, e.g. in accordance with the reaction, of Equation a:

$TiCl_4 + 2H_2 + O_2 \rightarrow TiO_2(s) + 4HCl$ and the oxygen in said flame is sufficient to maintain an oxidizing flame. The titanium dioxide thus formed consists of particles that are spherical in shape but with an average particle diameter below about 0.1 micron.

This ultra fine nascent titanium dioxide in aerosol form is then fed directly, and prior to the occurrence of any substantial agglomeration thereof, into a second turbulent flame into which the larger stream of said titanium tetrachloride or other volatile titanium compound and a free-oxygen-containing gas are being introduced. The reaction that occurs in this second flame is illustrated by the following equation:

(c) $TiO_2(<0.1\mu) + TiCl_4 + O_2 \rightarrow TiO_2(<0.2\mu) + 2Cl_2$

The resulting titanium dioxide particles are of spherical shape and have an average particle diameter between about 0.2 and 0.4 micron.

It should be pointed out that the reaction illustrated by Equation a above should be accomplished at temperatures above about 650° F. As this reaction is considerably exothermic, it is generally self-sustaining. However, the reaction illustrated by Equation b or c above, should be accomplished at temperatures above about 1200° F., and as this reaction is only mildly exothermic, auxiliary heat is generally necessary. Auxiliary heat can be supplied by preheating the various reactants or by introducing additional oxygen of free-oxygen-containing gas above and beyond that required for the main reaction, as represented by Equation b:

$TiCl_4 + O_2 \rightarrow TiO_2 + 2Cl_2$ together with a quantity of carbon monoxide. The additional oxygen and the carbon monoxide react highly exothermically according to the equation:

(d) $2CO + O_2 \rightarrow 2CO_2$ rendering the overall reaction, (e) $TiCl_4 + 2CO + 2O_2 \rightarrow TiO_2(s) + 2Cl_2 + 2CO_2$ self-sustaining. Needless to say other fuels which are substantially free of hydrogen can also be burned instead of, or in addition to, CO in order to produce the heat necessary to accomplish the same end.

The manner in which the oxygen, hydrogen or other gases are supplied to the flames is not critical. The oxygen can be supplied as pure oxygen gas and/or by means of any free oxygen-containing gas, for example, air.

Hydrogen can be supplied as pure hydrogen gas and/ or by means of any hydrogen-containing gas, such as ammonia, methane, ethane or other hydrocarbon-containing gas.

The reaction conditions, such as temperature, etc., and other details of the reactions illustrated by Equations a and b above are generally well known. General information and details relative to the reaction of Equation a are disclosed in co-pending applications of C. A. Stokes et al., Serial No. 129,089, filed November 23, 1949, and Wagner U.S. Patent 2,990,249. General information and details relative to the reaction illustrated by Equation *b* are disclosed for example, in U.S. Patents 2,689,781 and 2,488,439 to H. H. Schaumann and 2,559,638 to I. J. Krchma et al.

The process of the present invention can be accomplished either in a single, two zone reaction chamber, or in two separate but adjacent reaction chambers. These and other features of the invention will be better understood and appreciated from the following description of preferred embodiments thereof selected for purposes of illustration and shown in the accompanying drawings in which:

FIGURE 1 is a schematic diagrammatic illustration of an embodiment of the present invention wherein the two reactions are accomplished in a single, two zone reaction chamber; and FIGURE 2 is a schematic diagrammatic illustration of one embodiment of the invention wherein the two reactions are accomplished in two separate but adjacent reaction chambers.

In a typical operation, referring now to FIGURE 1, a mixture of vaporized titanium tetrachloride and dry air is split into two streams the smaller stream comprising between about 0.1 and 5.0% of the total. The smaller stream is heated to a temperature of about 300° F. and introduced continuously at high velocity by means of conduit 2 to reaction zone 4. Continuously therewith there is introduced to said zone by means of conduit 6, a quantity of gas containing sufficient hydrogen to stoichiometrically react with at least 50% of said titanium tetrachloride and preferably all thereof. Upon ignition thereof, an immediate reaction occurs according to the following Equation *a*

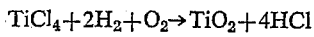
$$TiCl_4 + 2H_2 + O_2 \rightarrow TiO_2 + 4HCl$$

producing titanium dioxide particles that are essentially spherical in shape and have an average particle diameter of between about 0.01 and 0.10 micron. Said particles enter reaction zone 8 by means of throat 10.

Simultaneously with the occurrences above, there is continuously introduced into reaction zone 8 which may be cooled by air or water in jacket 12, if necessary, at high velocity in order to insure turbulent mixing therein, by means of conduit 14, the larger stream of the above-described mixture of $TiCl_4$ and air, representing between about 95.0 and 99.9% of the total mixture preheated to a temperature of at least about 500° F. as reaction according to Equation *c* occurs in reaction zone 8, the titanium dioxide particles from zone 4 grow larger to form titanium dioxide having an average particle diameter of between about 0.2 and 0.4 micron.

The titanium dioxide product, and the $Cl_2$, HCl and other by-products are then led by means of conduit 16 to quench 18 to prevent further reaction and/or particle growth. It is found that the overall reaction is self-sustaining under these conditions.

Referring now to FIGURE 2, it will be seen that in this embodiment of the invention, the two reactions are accomplished in separate but adjacent reaction chambers, 20 and 22. The products of the reaction according to Equation *a*,

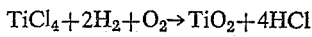
$$TiCl_4 + 2H_2 + O_2 \rightarrow TiO_2 + 4HCl$$

which occurs in reaction chamber 20 are fed into reaction chamber 22 simultaneously with titanium tetrachloride and air or oxygen. Carbon monoxide and oxygen, or other substances for auxiliary heating can be introduced if desired separately by means of conduit 24. The product titanium dioxide is substantially identical to the titanium dioxide produced in the apparatus of FIGURE 1 discussed above.

A better understanding of the invention can be obtained from the following examples which, however, should be construed as being illustrative in nature and as not limiting the scope of the invention.

Example 1

On a continuous basis, a mixture, comprising 2 pounds per hour of chemically pure titanium tetrachloride vapor and 138 s.c.f.h. of oxygen, preheated to about 300° F. is fed concurrently with 16 s.c.f.h. of hydrogen at ambient temperature to a 4 inch diameter by 12 inch long ceramic reaction chamber thereby producing gaseous hydrogen chloride and spherical titanium dioxide particles having an average particle diameter of about 30 millimicrons. The hot products are led immediately, and prior to any substantial agglomeration thereof, to an adjacent (see FIGURE 2) 2 foot diameter by 8 foot long ceramic reaction chamber to which there is fed continuously, a mixture of 998 pounds per hour of titanium tetrachloride vapor and 1860 s.c.f.h. of oxygen preheated to a temperature of about 700° F. The resulting reaction at about 2000° F. produces 421 pounds per hour of titanium dioxide, 744 pounds per hour of gaseous chlorine which is recycled to a chlorination reactor to produce additional titanium tetrachloride, and 3 pounds per hour of gaseous hydrogen chloride. The product titanium dioxide is spherical in shape and is found to be 90 percent of the rutile crystal form, and to have an average particle diameter of about 240 millimicrons.

Example 2

A mixture, comprising 2 pounds per hour of chemically pure titanium tetrachloride vapor and 138 s.c.f.h. of oxygen, preheated to about 300° F. is continuously fed, concurrently with 16 s.c.f.h. of hydrogen at ambient temperature to a 4 inch diameter by 12 inch long ceramic reaction chamber thereby producing gaseous hydrogen chloride and spherical titanium dioxide particles having an average particle diameter of about 30 millimicrons. The hot products are led immediately and prior to any substantial agglomeration thereof to an adjacent (see FIGURE 2) 2 foot diameter by 8 foot long ceramic reaction chamber to which there is continuously fed a mixture of 998 pounds per hour of titanium tetrachloride vapor and 1860 s.c.f.h. of oxygen preheated to a temperature of about 600° F. The reaction chamber is maintained at about 1600° F. by means of a water jacket which encircles said reaction chamber and the resulting reaction produces 421 pounds per hour of titanium dioxide, 744 pounds per hour of gaseous chlorine which is recycled to a chlorination reactor to produce additional titanium tetrachloride, and 3 pounds per hour of gaseous hydrogen chloride. The product titanium dioxide is spherical in shape, and is found to be 85 percent of the anatase crystal form, and to have an average particle diameter of about 240 millimicrons.

Example 3

To the first reaction zone of an elongated ceramic reactor comprising two reaction zones (FIGURE 1) there is continuously fed a mixture, comprising 1 pound per hour of chemically pure titanium tetrachloride vapor and 69 s.c.f.h. of high purity oxygen, preheated to a temperature of about 300° F., and 8 s.c.f.h. of hydrogen at ambient temperature. The products immediately and prior to any substantial agglomeration thereof, pass into the second reaction zone of said reaction to which there is continuously fed a mixture of 499 pounds per hour of titanium tetrachloride vapor and 930 s.c.f.h. of oxygen preheated to 700° F. The products of the resulting reaction at 2000° F. comprise 210 pounds per hour of titanium dioxide, 1.6 pounds per hour of gaseous hydrogen chloride and 372 pounds per hour of gaseous chlorine. The titanium dioxide is spherical in shape, and is found to be 95 percent of the rutile form and to have an average particle diameter of about 240 millimicrons.

Example 4

To the first reaction zone of an elongated ceramic reactor comprising two reaction zones (see FIGURE 1) there is continuously fed 8 s.c.f.h. of hydrogen at ambient temperature, and a mixture comprising 1 pound per hour of chemically pure titanium tetrachloride vapor and 69 s.c.f.h. of high purity oxygen, preheated to a temperature of about 300° F. The products from said first zone immediately enter the second zone to which there is continuously fed a mixture of 499 pounds per hour of titanium tetrachloride vapor and 930 s.c.f.h. of oxygen preheated to 600° F. This second reaction zone is maintained at a temperature of 1600° F. by means of a water jacket surrounding said chamber. The products of the reaction are 210 pounds per hour of titanium dioxide, 1.6 pounds per hour of gaseous hydrogen chloride, and 372 pounds per hour of gaseous chlorine. The titanium dioxide is spherical in shape, and is found to be 90 percent of the anatase form and to have an average particle diameter of about 240 millimicrons.

Example 5

A mixture, comprising 25 pounds per hour of chemically pure titanium tetrachloride vapor and 573 s.c.f.h. of high purity oxygen, preheated to about 300° F. is continuously fed concurrently with 229 s.c.f.h. of hydrogen at ambient temperature to the first reaction zone of an elongated two-zone ceramic reactor (see FIGURE 1). The resulting reaction produces gaseous hydrogen chloride and spherical titanium dioxide having an average particle diameter of about 70 millimicrons. The products of this reaction immediately enter the second reaction zone of the reactor to which there is continuously fed a mixture comprising 975 pounds per hour of titanium tetrachloride and 1480 s.c.f.h. of oxygen preheated to about 700° F. The resulting reaction at about 2000° F. produces 421 pounds per hour of titanium dioxide, 44 pounds per hour of gaseous hydrogen chloride and 705 pounds per hour of gaseous chlorine. The recovered titanium dioxide product is spherical in shape and is found to be 90 percent of the rutile form, and to have an average particle diameter of about 240 millimicrons.

Example 6

On a continuous basis, a mixture, comprising 2 pounds per hour of chemically pure titanium tetrachloride vapor and 138 s.c.f.h. of oxygen, preheated to about 300° F. is fed concurrently with 16 s.c.f.h. of hydrogen at ambient temperature to a 4 inch diameter by 12 inch long ceramic reaction chamber thereby producing gaseous hydrogen chloride and spherical titanium dioxide particles having an average particle diameter of about 30 millimicrons. The hot products are led immediately, and prior to any substantial agglomeration thereof, to an adjacent (see FIGURE 2) 2 foot diameter by 8 foot long ceramic reaction chamber to which there is fed continuously, in two separate streams (a) a mixture of 998 pounds per hour of titanium tetrachloride vapor, 2770 s.c.f.h. of air and 2770 s.c.f.h. of oxygen, and (b) a mixture comprising 3950 s.c.f.h. of carbon monoxide, 5300 s.c.f.h. of air, and 1040 s.c.f.h. of oxygen, both streams being preheated to a temperature of about 225° F. The resulting reaction at about 2500° F. produces 421 pounds per hour of titanium dioxide, 744 pounds per hour of gaseous chlorine which is recycled to a chlorination reactor to produce additional titanium tetrachloride, and 3 pounds per hour of gaseous hydrogen chloride. The product titanium dioxide is spherical in shape and is found to be 90 percent of the rutile crystal form, and to have an average diameter of about 240 millimicrons.

It can be readily seen that, by this invention, we provide a relatively inexpensive method for producing opacity-grade metal-oxide pigments. The oxygen is readily available from the air, and the nascent pigment particles serve as a nucleus for building up the opacity-size final product, while imparting the proper shape thereto.

Obviously many changes can be made in the above-described process, apparatii, examples and accompanying drawings without departing from the scope of the present invention. For example, although only titanium tetrachloride was specifically mentioned above, other titanium halides such as titanium tetrabromide and titanium tetrafluoride can be utilized in place of, or together with, titanium tetrachloride. Accordingly, it is intended that the above-disclosure be regarded as illustrative and as in no way limiting the scope of the invention.

What we claim is:

1. A continuous process for obtaining a titanium dioxide pigment essentially spherical in shape and having an average particle diameter between about 0.2 and 0.4 micron which comprises (a) continuously burning in a first reaction zone at temperatures above about 650° F., vapors of a titanium halide, an oxygen-containing gas, and a hydrogen-containing gas, said hydrogen-containing gas being present in at least sufficient quantities to provide enough hydrogen to react with the majority of said titanium halide in accordance with the stoichiometry of the reaction $$TiX_4 + H_2 + O_2 \rightarrow TiO_2(s) + 4HX$$

wherein X is a halogen, to produce titanium dioxide of essentially spherical shape and having an average particle diameter below about 0.1 micron, and (b) continuously burning at a temperature above about 1200° F. in a second reaction zone and in the presence of the nascent titanium dioxide product of said first reaction zone, an oxygen-containing gas, and at least 19 times as much vaporized titanium halide as is introduced to said first reaction zone in accordance with the reaction $$TiX_4 + O_2 \rightarrow TiO_2(s) + 2X_2$$

wherein X is a halogen, and recovering the resulting titanium dioxide pigment.

2. The process of claim 1 wherein said vapors of a titanium halide in both reaction zones comprises titanium tetrachloride.

3. A continuous process for obtaining a titanium dioxide pigment essentially spherical in shape and having an average particle diameter between about 0.2 and 0.4 micron which comprises (a) continuously burning in a first reaction zone at temperatures above about 650° F. vapors of a titanium halide, an oxygen-containing gas, and a hydrogen-containing gas, said hydrogen-containing gas being present in at least sufficient quantities to provide enough hydrogen to react with the majority of said titanium halide in accordance with the stoichiometry of the reaction $$TiX_4 + 2H_2 + O_2 \rightarrow TiO_2(s) + 4HX$$

wherein X is a halogen, to produce titanium dioxide of essentially spherical shape and having an average particle diameter below about 0.1 micron, and (b) continuously burning at a temperature above about 1200° F. in a second reaction zone and in the presence of the nascent titanium dioxide product of said first reaction zone, an oxygen-containing gas, carbon monoxide, and at least 19 times as much vaporized titanium halide as are introduced to said first reaction zone in accordance with the reaction $$TiX_4 + 2CO + 2O_2 \rightarrow TiO_2(s) + 2X_2 + 2CO_2$$

wherein X is a halogen, and recovering the resulting titanium dioxide pigment.

References Cited in the file of this patent

UNITED STATES PATENTS

| | | |
|---|---|---|
| 2,823,982 | Saladin et al. | Feb. 18, 1958 |
| 2,964,386 | Evans et al. | Dec. 13, 1960 |